United States Patent [19]
Edlinger

[11] Patent Number: 5,776,226
[45] Date of Patent: Jul. 7, 1998

[54] METHOD FOR WORKING UP REFUSE OR METAL-OXIDE-CONTAINING REFUSE INCINERATION RESIDUES

[75] Inventor: Alfred Edlinger, Baden, Switzerland

[73] Assignee: "Holderbank" Financiere Glarus AG, Glarus, Switzerland

[21] Appl. No.: 539,678

[22] Filed: Oct. 5, 1995

[30] Foreign Application Priority Data

Oct. 10, 1994 [AT]  Austria ..................... 1910/94

[51] Int. Cl.$^6$ .................. C21B 11/00; C22B 7/04
[52] U.S. Cl. .................. 75/500; 75/585; 75/629; 75/640; 75/658; 75/669; 75/691; 75/694; 75/501; 420/590
[58] Field of Search .................. 75/500, 501, 502, 75/640, 585, 629, 658, 669, 691, 694; 420/590

[56] References Cited

U.S. PATENT DOCUMENTS 3,890,908  6/1975  von Klenck et al. .
4,707,185  11/1987  Kimura et al. ............... 75/640
5,364,447  11/1994  Philipp et al. ............... 75/500

FOREIGN PATENT DOCUMENTS

| 024 250 | 2/1981 | European Pat. Off. . |
| 2 293 494 | 7/1976 | France . |
| 2 304 369 | 12/1974 | Germany . |
| 30 19 066 | 12/1980 | Germany . |
| 56-30385 | 7/1981 | Japan ............... 75/640 |
| 1195241 | 8/1989 | Japan ............... 75/512 |
| 1668439 | 8/1991 | U.S.S.R. ............... 75/500 |

Primary Examiner—Melvyn Andrews
Attorney, Agent, or Firm—Cushman Darby&Cushman IP Group of Pillsbury Madison & Sutro LLP

[57] ABSTRACT

A method for working up refuse or metal-oxide-containing refuse incineration residues or metallurgical residues includes an at least partial oxidation in a meltdown oxidizing reactor followed by a two-stage reduction. The first reduction stage is effected in an iron bath reactor in which iron oxides are not yet reduced. In the second reduction stage also iron oxides are reduced in an iron bath calciner, a pig iron bath being obtained. The metal bath discharged from the iron bath reactor reaches a segregation mold, from which crude bronze can be drawn off.

9 Claims, 1 Drawing Sheet

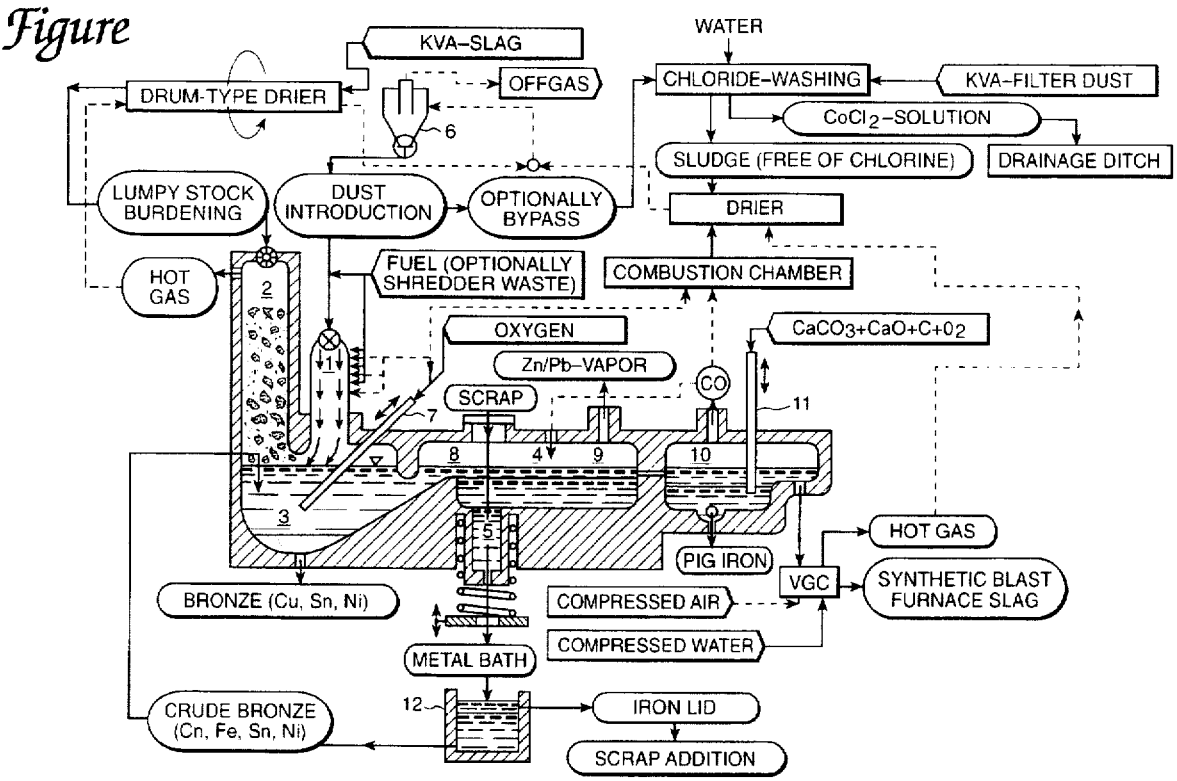
Figure

METHOD FOR WORKING UP REFUSE OR METAL-OXIDE-CONTAINING REFUSE INCINERATION RESIDUES

The invention relates to a method for working up refuse or metal-oxide-containing refuse incineration residues, in particular used catalysts, motorcar shredder light fractions, scrap metals, galvanic residues and/or sewage sludge, wherein the dried and preheated solids are supplied to a meltdown oxidizing reactor, as well as an arrangement for carrying out the method.

To dispose of waste products of any kind, such as, for instance, industrial, domestic and/or special refuse as well as waste fractions incurring in motorcar disposal, various methods have become known. In addition to pyrolytic separation for the purpose of separating volatile or liquefiable organic components as can be taken, e.g., from DE 23 04 369B, different configurations of meltdown gasifying reactions have become known. Methods of this kind in FR 75 35 789A and in EP-0 024 250 A1 are applied to the thermal decomposition of high-carbon substances, in particular waste substances. In DE 30 19 066 A1 a method for recovering iron, zinc and lead contained in residues of blast furnace processes is described. A complex reaction in a closed metallurgical vessel as a substitute for conventional calcining reactions consists of a rapid reduction by coal contained in the iron bath, the selective volatilization of reduced zinc, iron melting and the deposition of metallic lead on the vessel ground under enrichment of sulfur in a slag layer. With meltdown gasifying processes, the use of meltdown oxidizing reactors, in particular, has already been suggested, in which metallic portions are largely oxidized to slags, whereupon the slags obtained are reacted to reusable substances, such as, for instance, cement aggregates or cement substitutes by various forms of further processing.

The method according to the invention, of the initially defined kind aims at separately discharging from the initially mentioned residues siderophilic metals, in particular copper, tin and nickel, as well as atmosphilic metals, in particular, cadmium, zinc and lead, and at obtaining nonferrous-metal-free pig iron as well as largely iron-free synthetic blast furnace slag capable of being recovered, in particular, with an elevated content of aluminum oxide thus exhibiting hydraulic properties and being able to markedly increase the early strength values of mixed cements produced therefrom. To solve this object, the method according to the invention substantially consists in that, after an at least partial oxidation of the melt to slag under separation of a metal bath, the slag is reduced in two stages, wherein a nonferrousmetal reduction under formation of an iron bath from which nonferrous metals are segregated in the form of crude bronze is carried out in a first stage by adding scrap or by blowing in $CO/CO_2$, and an indirect iron reduction is carried out in the second reduction stage by means of $CaCO_3$, CaO and carbon as well as optionally $O_2$ to reduce the FeO content of the slag. Due to the two-stage reduction proposed according to the invention, it is feasible to metallize but siderophilic metals, for instance in the form of crude bronze, in a first reduction stage with iron oxides remaining in the slag. It is only in the second reduction stage that an indirect iron reduction is to be effected to reduce the FeO content of the slag, wherein according to the invention, due to the measure of operating under the addition of calcium carbonate, calcium oxide and carbon as well as optionally oxygen in the second reduction stage, a calcining reaction is performed, which results in an important improvement of the properties of the slag for the purposes sought. In such a calcining reaction, which produces a slag melt substantially free of heavy metals, heavy metals and siderophilic elements having already been separated, the following reactions basically are involved:

$C+Fe \rightarrow Fe_3C$ $CaCO_3 \rightarrow CaO+CO_2$ $Fe_3C+CO_2 \rightarrow CO+3Fe$ $CO_2+C \rightarrow 2CO$ $C+\frac{1}{2}O_2 \rightarrow CO$ The CO formed can diffuse from the iron bath into the slag, thus reducing iron oxide present. However, the iron reduction of the slag occurs only to a volume portion of about 15% by vol. of CO in the $CO/CO_2$ gas mixture. According to a preferred further development of the method according to the invention it is, therefore, proceeded in a manner that the $CO/CO_2$ gas mixture formed in the second reduction stage is partially burnt with $O_2$ to reduce the reduction potential and is introduced into the first reduction stage intended for the reduction of Cu. Consequently, the nonferrous metal reduction in this first reduction stage can be assisted by a substantially reduced reduction potential which would not suffice for any further reduction of iron in the second reduction stage. This first reduction stage is effected above an iron bath, wherein the partial pressure ratio of $CO:CO_2$ does not suffice to reduce also FeO already in the iron bath reactor in which the first reduction is carried out. Whenever the CO partial pressure would be too high for such a limitation, an additional partial combustion would have to be carried out with oxygen in order to make sure that in the first reduction stage merely a nonferrous-metal reduction is actually effected. The reduction potential of the $CO/CO_2$ mixture, therefore, must be kind of neutralized so that FeO cannot be reduced from the slag in the iron bath reactor in which the first reduction stage is realized.

In the second reduction stage, in which, in addition to the slag, an iron bath likewise is again present, into which $CaCO_3$, CaO and carbon may be introduced, the iron oxide of the slag refines the carbon portion of the iron bath by direct reduction. The relevant reaction equation in the iron bath calciner may be formulated as follows:

$Fe_3C+(FeO)$ slag$\rightarrow 4(Fe)$ iron bath$+CO\uparrow$

This refining process is further assisted by appropriate turbulances, wherein it is advantageously proceeded in that $CaCO_3$, CaO and/or C as well as optionally $O_2$ are blown into an Fe bath provided below the slag bath through a lance. The quick lime (CaO) formed in the iron bath calciner is lighter than the iron bath and insoluble in the same, diffusing into the acidic slag melt containing $SiO_2$ and $Al_2O_3$. There, an exothermal reaction with the silicate portion to synthetic blast furnace slag takes place, which considerably enhances the energy balance. Due to refuse incineration residues, a high $Al_2O_3$ content is to be taken into account, which in the end results in the desired high early strength values of the respective mixed cements upon slag granulation. Heating of the iron bath calciner according to the invention may be effected in a simple manner by oxygen-refining to CO the carbon dissolved in the iron bath. Other ways of heating, such as, for instance, inductive or conductive heating, are, of course, conceivable as well.

Advantageously, in the second reduction stage, iron oxide of the slag is used for refining the iron bath, wherein the nonferrous metal impurities from the Fe introduced into the first reduction stage in the form of scrap preferably are completely segregated in the first reduction stage. Thus, the Fe introduced into the first reduction stage can be recovered in the second reduction stage without nonferrous-metal impurities. The scrap iron originally introduced into the first reduction stage is recovered in a metallurgically pure form, in particular without impurities caused by copper, and hence appropriately purified at the same time. Normally, scrap iron contaminated with nonferrous metals can be upgraded to a required quality level only by admixing blast furnace pig iron. Waste scrap iron, as a rule, is totally unusable, thus being mostly dumped. The two-stage reduction according to the invention now offers the opportunity of appropriately purifying in the first reduction stage even such starting materials like waste scrap, which have not been usable so far and to subsequently convert the same into a reusable product, i.e., high-grade pig iron. At the same time, atmosphilic mixed metals and bronzes can be separated, a clean metal fractionation thus being feasible. In the iron bath reactor, in which the first, gentle reduction stage is carried out, it is feasible to segregate a liquid copper alloy, which may contain other siderophilic heavy metals, such as tin and nickel, in addition to copper. This copper alloy, in accordance with a preferred further development of the method according to the invention, finally may be upgraded by repetition, to which end recycling into the meltdown oxidizing reactor takes place. There, the oxidation potential may be adjusted in a manner that the total charge as far as to, and inclusive of, iron is burnt without burning the nobler copper at the same time.

In a particularly advantageous manner, the method according to the invention is realized in that the oxidation potential in the meltdown oxidizing reactor is adjusted in a manner that the combustion is controlled as far as to Fe under exclusion of nobler metals like Cu, Cu being drawn off as a melt.

The arrangement according to the invention for carrying out the method of the invention, in addition to a meltdown oxidizing reactor, is substantially characterized in that an iron bath reactor and an iron bath calciner are arranged to follow the meltdown oxidizing reactor, being interconnected via overflow channels for the slag phase. The iron bath reactor serves to carry out the first reduction stage, whereas the iron bath calciner constitutes the second reduction stage. Advantageously, the configuration is such that the meltdown oxidizing reactor comprises a flash smelting shaft and/or a counterflow shaft furnace to which a dust feeder as well as a burner, for instance for introducing shredder refuse, are connected, a granulating means, such as a vapor granulating crusher, preferably being connected to the slag discharge of the iron bath calciner. A counterflow shaft furnace is of particular advantage because of its counterflow preheating of the burden and because of the fact that dust is effectively retained thus facilitating the charging of solids. In particular a granulating means of this kind, such as, for instance, a vapour granulating crusher, advantageously may be operated by compressed water, which necessarily presupposes the slag to have an extremely low content of technically pure iron so as to avoid oxyhydrogen gas explosions. It is exactly this high purity which is guaranteed by the use of an iron bath calciner.

In a particularly advantageous manner, the arrangement according to the invention is further developed in that a stack for the discharge of metal, in particular Pb vapor, and a closeable opening for the addition of scrap are connected to the iron bath reactor, wherein the discharge for the metal bath of the iron bath reactor is simply equipped with an inductive heating and the consecutively arranged segregation mold is operated with an iron lid.

In the following, the invention will be explained in more detail by way of exemplary embodiments as well as by way of an embodiment of the arrangement according to the invention schematically illustrated in the drawing.

Example 1

The following slag composition was found for refuse slag processing:

| Starting refuse slag | |
|---|---|
| Component | Portion (wt. %) |
| Scrap iron | 8 |
| Scrap aluminum | 2 |
| unburnt C | 2 |
| Minerals | 88 |

| Analysis Minerals | |
|---|---|
| Component | Portion (%) |
| L.O.I. | 4 |
| $SiO_2$ | 47 |
| $Al_2O_3$ | 10 |
| $Fe_2O_3$ | 6 |
| CaO | 15 |
| MgO | 3 |
| $SO_3$ | 1.6 |
| $K_2O$ | 1 |
| $Na_2O$ | 4 |
| $TiO_2$ | 1 |
| Cl | 0.5 |
| Ni | 0.01 |
| Cr | 0.05 |
| Sn | 0.02 |
| Cu | 1 |
| Pb | 0.25 |
| Zn | 0.4 |

Heating of the flash smelting shaft was effected with natural gas ($H_U$=36 MJ/Nm$^3$) 0.56 Nm$^3$ of natural gas (about 2 GJ/t slag) were required per ton of refuse slag. 190 KWh of electric heat retention work were required in the iron bath reactor per ton of molten slag.

Also the heat in the iron bath calciner was maintained inductively, to which end 240 KWh/t of electric heat retention work were necessary.

The heavy metal content of the synthetic blast furnace slag obtained was below the detection limit of AAS (atom absorption analysis).

The alkaline content ($K_2O+Na_2O$) was drastically lowered by the addition of limestone, evaporating according to the following mechanism:

$Na_2SiO_3+CaO \rightarrow Na_2O\uparrow+CaSiO_3$ 250 kg limestone ($CaCO_3$) (corresponding to 140 kg CAO) were added upon grinding to each ton of slag melt (calculated free of iron oxide).

The addition of $CaO/CaCO_3/C/O_2$ into the iron bath within the iron bath calciner was controlled as a function of the $CO/CO_2$ partial pressure ratio desired. It even is conceivable to refine the iron bath within the iron bath calciner to steel quality.

After the reduction of iron oxide and the addition of lime, the slag obtained has the following chemical analysis:

| Component | Portion (%) |
|---|---|
| $SiO_2$ | 48 |
| $Al_2O3$ | 11 |
| CaO | 31 |

-continued

| Component | Portion (%) |
|---|---|
| MgO | 5 |
| $K_2O$ | 1 |
| $Na_2O$ | 0.5 |
| $TiO_2$ | 3 |

After water-spray granulation of the slag, the following mineral phases could be identified:

The slag is preponderantly glassy with MELILITHE- (akermanite: $2\,CaO-MgO-2\,SiO_2$) and DIOPSIDE- ($CaO-MgO -2\,SiO_2$) crystal phases Hydraulicity tests (hydraulic index according to the "Keil"-method) yielded very good slag quality (HI=87%). Thus, the slag is perfectly suitable as a hydraulically active mixed-cement component.

Moreover, 150 kg of pig iron corresponding to blast furnace iron quality could be recovered per ton of refuse slag.

In addition to these substantially metallurgical processes, the energy consumption may be further minimized by appropriate pretreatment. An advantageous pretreatment was effected, in particular, of filter dusts in order to minimize the chloride charge. For, chloride has an extraordinarily negative influence on metallurgy, since it may lead to heavy metal chloride volatilization and even to the formation of what is called gall of glass, which is supposed to consist of calcium chloride. Such a gall of glass practically cannot be separated from purified slag melts. Chloride in slag cement also may have extremely adverse effects on the evolution of strength as well as on the corrosion behavior if used, for instance, in steel concrete.

A suitable method in terms of thermal economy, thus, also comprises integrated preheating, to which end flash smelting shaft processes or counterflow shaft furnaces may be employed. The transmission of heat, moreover, can be substantially improved and intensified by the introduction of processing stock in the form of dust.

For slag drying in a drum type drier, it is suitable to treat the air-borne dust forming, in a manner similar to KVA filter dusts (filter dusts derived from melting and reduction processes).

In a flash smelting shaft, the dust charge in an extremely advantageous manner can be converted into melt droplets with a total oxidation being readily feasible. Due to the high ratio of the solids or melt surface to the gas space, the optimum transmission of heat is ensured. The dried and dedusted lumpy stock may be added to the liquid slag melt in doses in a simple manner through the offgas stack, wherein the metal melt forming and descending must be oxidized, for instance by means of an immersed lance, in order to safeguard the desired oxidation. In case of complete oxidation, chloride quantitatively evaporates either in the form of heavy metal chlorides, $Cl_2$ or HCl. Too high a charge of chloride may involve serious deposition problems in the offgas stack or in the preheating system due to condensation. A sulfur charge quantitatively is burnt primarily to $SO_2$ and likewise may involve deposition problems. In the meltdown oxidizing reactor a tap is to be provided on the lowermost site in order to be able to withdraw a copper-tin-nickel alloy possibly formed.

In the initially demanded iron bath reactor, the temperature will be maintained inductively in a particularly advantageous manner. As a result, the coil system may, for instance, be reduced in case no heat supply is required, thus reducing the power loss involved in coil water cooling. In such an iron bath reactor, the formation of two immiscible stable metal phases, namely a light iron phase as well as a heavy copper-containing phase, has shown to occur. At the beginning of the iron bath reaction, an iron alloy corresponding to the charge of scrap or refuse scrap is, for instance, present all over the iron bath. Refuse scrap of this kind, as a rule, contains copper, for instance, in an amount of 0.5 wt. %. In order to maintain such a scrap alloy in the molten state, temperatures of approximately 1550° C. are required. With the slag starting to flow over this iron bath, copper oxide is reduced out of the slag, iron simultaneously being oxidized out of the bath to iron oxide. The iron bath becomes accordingly richer in copper, iron oxide migrating into the slag. As soon as the iron bath has a content of about 20 wt. % of copper, the bath temperature can be lowered to approximately 1480° C. without a solid metal alloy separating. With an adequately sufficient reduction force of the iron bath for the necessarily low copper content of the slag, an equilibrium is subsequently reached in the iron-copper phase diagram, in which the metal bath is liquid at 1450° C. like the slag. Upon termination of the slag flow, the iron bath can be tapped and cool to a temperature of about 1100° C. An iron alloy including approximately 8% copper in that case separates as a covering layer, floating on a liquid copper alloy having an iron content of about 4%. This copper alloy, from a metallurgical point of view, constitutes crude bronze thus being a precious raw material. The iron covering layer subsequently may be reintroduced into the iron bath along with scrap in order to balance out iron losses, 6 parts of iron alloy each being in equilibrium with 5.5 parts of copper alloy.

The crude slag, as a rule, has a copper content of approximately 1 wt. %, which is to be depleted towards zero. According to the mode of operation proposed by the invention, 48 tons of slags can be freed from copper by one ton of iron charge.

If also the total of tin oxide is to be reduced out of the slag at 1500° C., the tapping concentration of the iron bath amounts to about 75% iron.

Due to whirling streams and on grounds of the thermal current, kind of turbulences are created directly above the induction crucible, which cause the slag to thoroughly mix with iron, this being beneficial to the reduction of nonferrous metals out of the slag melt. Such turbulences may be further intensified by inductive stirring. The deposition of reduced nonferrous metals again occurs in a laminar zone, a relatively thin slag layer being of decisive importance in the laminar zone in any event in order to ensure short deposition distances and times of the reduced nonferrous metals. It is important that the iron bath does not get into contact with carbon anywhere, since in equilibrium with carbon very high-melting cementite would form thus inevitably inducing an extreme increase in the viscosity of the iron bath, which strongly delays, if not renders impossible, the sedimentation of nonferrous metals. The atmosphilic heavy metals zinc and lead leave the slag by way of gas and may be discharged through a stack, condensed or burnt. The depleted slag melt may be cooled to hydraulically and puzzolanically active materials by means of a gas granulation or vapor granulation, crusher.

EXAMPLE 2

Copper slag forming from converter slag in the Perce-Smith oxidation method incurs in the liquid state at 1350° C., having the following composition:

| Main component | Portion (%) |
| --- | --- |
| $SiO_2$ | 27.8 |
| $Al_2O_3$ | 5.7 |
| $Fe_2O_3$ | 50.3 |
| CaO | 3.8 |
| MgO | 2.2 |

| Second. component | Portion (%) |
| --- | --- |
| $SO_3$ | 0.50 |
| $K_2O$ | 0.13 |
| $Na_2O$ | 0.64 |
| $TiO_2$ | 0.36 |
| $Mn_2O_3$ | 0.35 |
| $P_2O_5$ | 0.27 |

| Nonferrous met. | Portion (ppm) | TVA-limit value (ppm) |
| --- | --- | --- |
| Cu | 11000 | 500 |
| Pb | 12000 | 500 |
| Zn | 36000 | 1000 |

The above analysis indicates a high iron oxide content as well as heavy metal contents which allow this slag to be dumped on a special waste dump only. By the method according to the invention, the above copper slag is converted into a) high-grade puzzolane as a mixed cement component
b) so-called "blister copper"
c) a zinc/lead mixed metal
d) high-grade cast iron.

The method according to the invention, therefore, is capable of raising the overall net output potential of copper smelting. Moreover, disposal problems, i.e., waste dumps, are avoided.

The liquid copper slag was supplied to an oxidizingly heated holding ladle, i.e., a meltdown oxidizing reactor. Heating was effected by means of a natural gas/air burner. In doing so, the air may be enriched, or replaced, with oxygen. The melting stock was heated to 1500° C. and subsequently supplied to the inductively heated iron bath reactor. There, heavy metal depletion took place in the manner already described; crude copper (~4% Fe) is supplied to the oxidizingly operated holding ladle for the combustion of iron and there is recovered as blister copper. Zn and Pb evaporate.

The heavy-metal-depleted slag still had a high iron oxide content and was supplied to the already known iron bath calciner. There, the iron oxide was reduced by means of $C/O_2/CaCO_3$ and drawn off as pig iron. The slag was obtained as a glassy substance (puzzolane) by aid of a pneumatic granulator.

The puzzolane had the following composition:

| Component | Portion (%) |
| --- | --- |
| $SiO_2$ | 64 |
| $Al_2O_3$ | 13 |
| $Fe_2O_3$ | 4 |
| CaO | 12 |
| MgO | 5 |

The product practically was obtained at a glass content of 98%, having excellent puzzolanic properties according to ASM C109 with SAI=112% (in particular, significant increase in the 28-day-strength of the mixed cement).

In the following, the invention again will be explained in more detail by way of an exemplary embodiment of an arrangement according to the invention schematically illustrated in the drawing.

BRIEF DESCRIPTION OF DRAWING

FIGURE is a schematic diagram of an embodiment of a system in accordance with the present invention.

From the drawing, a flash smelting shaft 1 is apparent, which, like the offgas shaft 2, is arranged above a meltdown oxidizing reactor 3. Dust may be introduced into the flash smelting shaft 1, fuel and optionally shredder refuse also being feedable. Into the offgas shaft 2, lumpy material is introduced, which previously may be heated in a drum type drier. From the meltdown oxidizing reactor, in which iron, aluminium and carbon oxidation is effected, the slag gets into an iron bath reactor 4 to which a heated bath discharge 5 is, connected. The bath discharge 5 is equipped with an induction heating and a displaceable induction coil in order to minimize the power loss in case no heating is required. The dust portion introduced into the flash smelting shaft, for instance, may be derived from a dedusting cyclone 6. Filter dust from refuse incineration plants should be subjected to chloride washing before being introduced into the flash smelting shaft 1.

The desired oxidation within the meltdown oxidizing reactor is ensured by blowing oxygen into the slag bath through a lance 7. In the overflow region between the meltdown oxidizing reactor 3 and the iron bath reactor 4, there is a turbulent zone 8 provided above the heated discharge 5, in which a particularly intensive slag reaction occurs. Following thereupon in the flow direction of the slag within the iron bath reactor 4, a laminar zone 9 forms, in which the deposition of nonferrous metals is enhanced. After this, the slag gets into an iron bath calciner 10. In this iron bath calciner 10, calcium carbonate, calcium oxide, carbon and optionally oxygen are injected into the metal bath present below the slag through a lance 11. The metal bath may be drawn off again as pig iron. Zinc and lead may be drawn off the iron bath reactor 4 in vapor form. The $CO/CO_2$ mixture with an accordingly reduced reduction may be drawn off the iron bath calciner 10 and recycled to the iron bath reactor 4.

Finally, the slag may be discharged from the iron bath calciner 10 and supplied to a vapor granulating crusher to which compressed air and compressed water are fed. The product of this vapor granulating crusher is a synthetic blast furnace slag having excellent hydraulic properties, the hot gas forming in the granulation being recyclable to a dryer.

The metal discharged from the iron bath reactor through the metal discharge 5 is supplied to a segregation mold 12 from which crude bronze is segregated below an iron covering layer. This crude bronze may be recycled to the melting oxidizing reactor 3 with the oxidation in that case preferably being adjusted in a manner that nonferrous metals or nobler metals than iron will no longer be oxidized so as to be able to immediately draw off the meltdown oxidizing reactor 8 a metal phase comprised of bronze.

On the whole, the overall process is exothermal, thus being applicable to the recovery of energy in an advantageous manner.

What I claim is:

1. A method for working up solids comprising iron, nonferrous metals including siderophilic metals such as Cu, Ni, and/or Sn, and/or atmosphilic metals such as Cd, Zn, and/or Pb and/or oxides thereof formed by at least one of refuse, metal-oxide-containing refuse incineration residues, galvanic residues and/or sewage sludge, by drying and preheating said solids and supplying said solids to a meltdown oxidizing reactor for obtaining a melt, the improvement comprising the steps of: at least partially oxidizing said melt so as to obtain a slag having an FeO content, reducing said slag in two reduction stages comprising a first reduction stage for carrying out a nonferrous-metal reduction by adding scrap and/or introducing a $CO/CO_2$ mixture to said slag so as to enhance the deposition of siderophilic metals from said slag, and vaporizing atmosphilic metals from said slag;

a second reduction stage for carrying out a direct iron reduction by introducing $CaCO_3$, CaO and carbon below said slag remaining after said first reduction stage so as to reduce said FeO content of said slag bath and forming a $CO/CO_2$ mixture, partially burning said $CO/CO_2$ mixture with $O_2$ for reducing the reduction potential of said mixture and introducing said partially burnt $CO/CO_2$ mixture to said slag in said first reduction stage, and recovering iron-free slag and nonferrous metal-free iron.

2. A method as set forth in claim 1, wherein said direct iron reduction of said second reduction stage is carried out under addition of $O_2$.

3. A method as set forth in claim 1, wherein said partial oxidation of said melt combusts Fe components of said melt exclusive of nobler metal components including Cu, Cu being drawn off as a melt.

4. A method as set forth in claim 1, further comprising using a lance for blowing at least one of $CaCO_3$, CaO and carbon below said slag.

5. A method as set forth in claim 4, further comprising blowing $O_2$ through said lance.

6. A method as set forth in claim 1, wherein iron oxide of said slag in said second reduction stage is used for refining said iron.

7. A method as set forth in claim 1, wherein said first reduction stage further comprises complete deposition of said siderophilic metals, introduced into said first reduction stage in the form of scrap, from said slag.

8. A method as set forth in claim 1, further comprising separating from said deposition of said siderophilic metals in said first reduction stage a liquid copper alloy containing, in addition to Cu, further siderophilic heavy metals including Sn and Ni, and recycling said copper alloy to a meltdown oxidizing reactor.

9. The method of claim 1, further comprising a step wherein a crude bronze formed from said nonferrous metals is recovered.

* * * * *